INVENTORS.
HENRY L. HENZE,
NEWTON E. SPIESS, JR.,
BY EDWARD J. CORNISH &
EDWARD J. KENNELLY their ATTORNEYS.

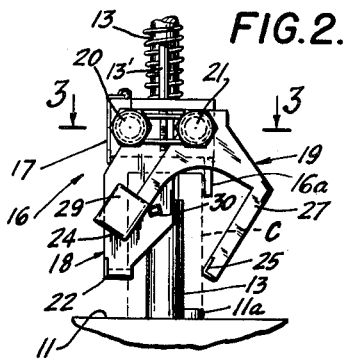
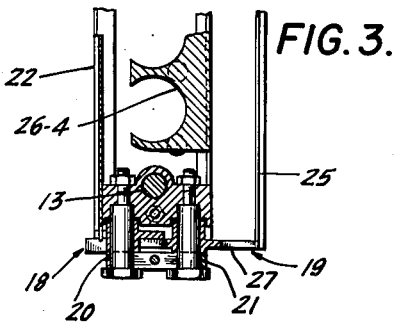
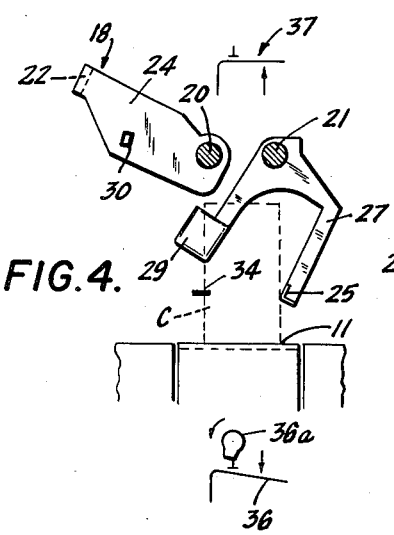
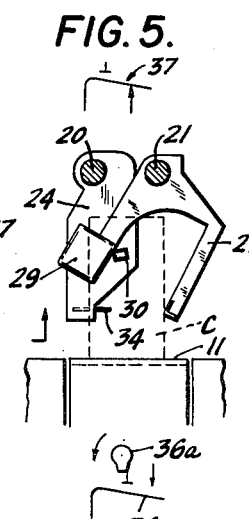
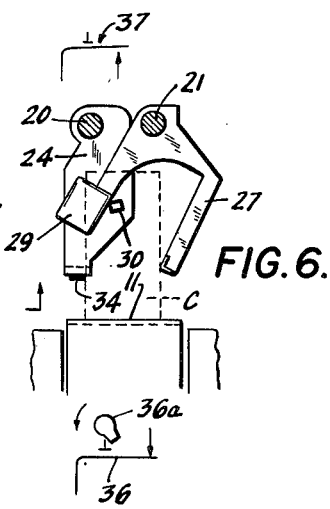
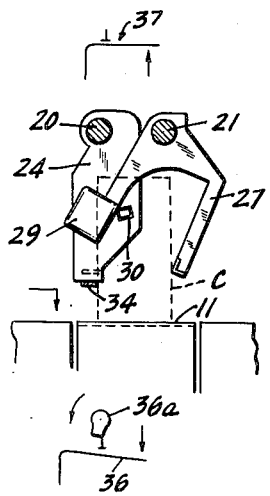
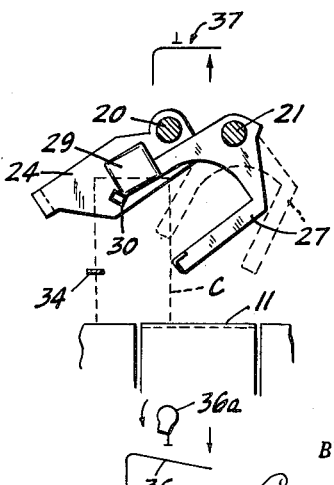

United States Patent Office 2,792,028
Patented May 14, 1957

2,792,028

APPARATUS FOR PROCESSING CONTAINERS OR THE LIKE

Henry L. Henze and Newton E. Spiess, Jr., Oakdale, Edward J. Cornish, Sayville, and Edward J. Kennelly, Bayport, N. Y., assignors, by mesne assignments, to National Dairy Products Corporation, New York, N. Y., a corporation of Delaware Application May 14, 1956, Serial No. 584,501

4 Claims. (Cl. 141—97)

This invention relates to apparatus for processing containers and more particularly to such apparatus adapted, for example, to accommodate containers for filling, charging with gas, or like operations.

Batch processing of containers in which a small number of containers are accommodated at one time for filling, gassing, or the like, is particularly adapted for the dairy industry where the processing is done in local dairies, the total volume of business of which does not justify the use of fully automatic equipment. Gas whipped and dispensed cream is a typical dairy product of this type, being widely sold today in small pressurized containers charged with a gas which serves as both the expelling and whipping agent. Suitably controlled in preparation, a highly pleasing whipped product results at the touch of a valve by the consumer.

A typical batch processing technique requires the operator to position a requisite number of containers in the apparatus and to initiate its operation to process the containers automatically thereafter. It is possible in the practice of such techniques for the operator to process a given container or batch of containers twice. This can result in waste, damage to the product or in some cases possible subsequent injury to handlers or consumers due to over filling, over charging or the like. Also, there is a certain element of danger to the operating personnel of the apparatus who, performing a simple manual operation time and again, are likely to make a careless move resulting in a serious injury.

The present invention has for its object, therefore, to provide apparatus for use in the batch processing of containers, particularly in the dairy industry, whereby hazards to operating personnel are greatly reduced, as is the possibility of reprocessing an already processed container.

A representative embodiment of the invention from which the above and other features will be readily understood is described below having reference to the accompanying drawings in which:

Figure 2 is a view in end elevation of a portion of the apparatus of Figure 1;

Figure 1:
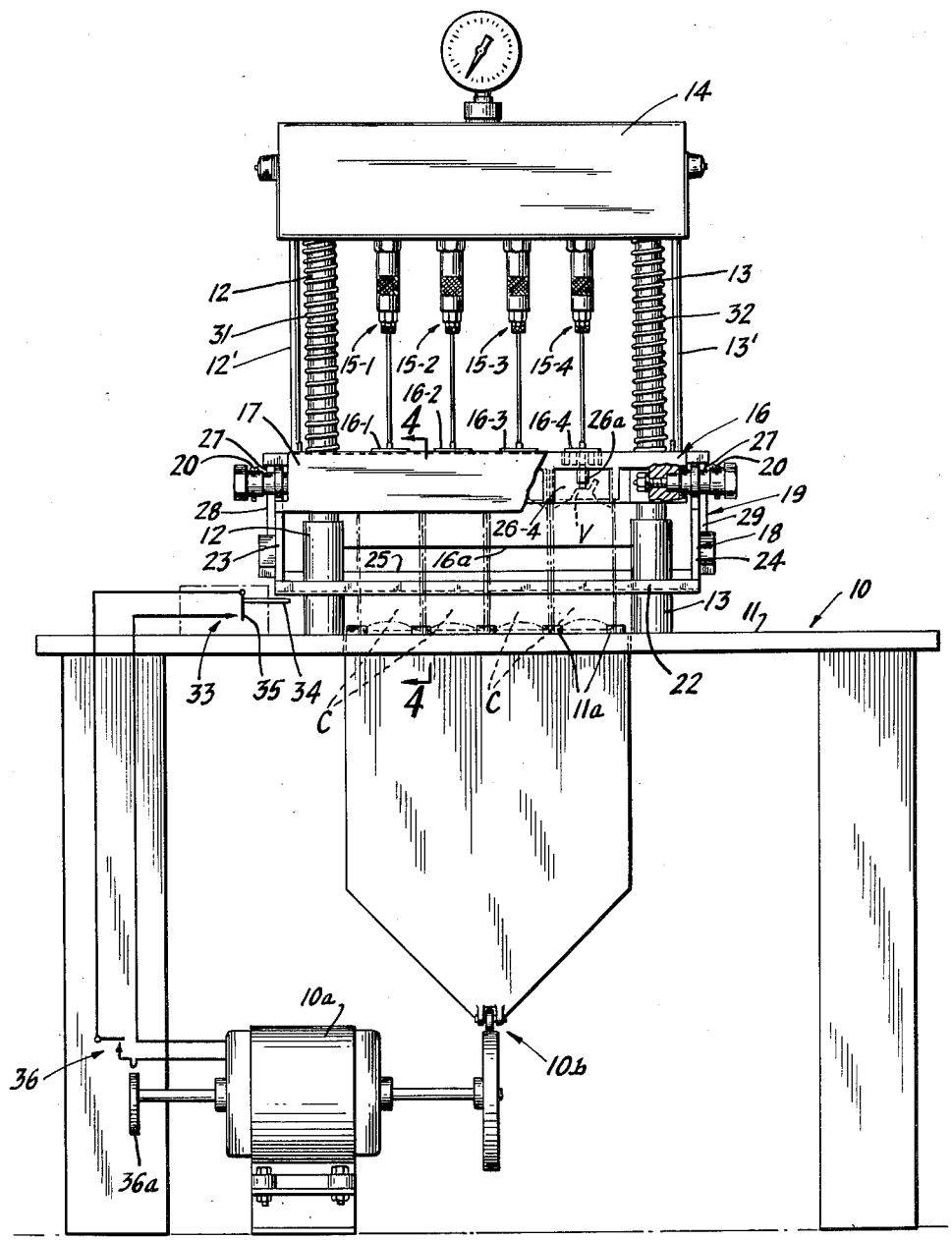
Figure 1 is a view in front elevation partly broken away in vertical section of a batch processing apparatus particularly useful in the charging of containers with gas.

Figure 3 is a view in transverse section taken on the line 3—3 of Figure 2 looking in the direction of the arrows; and Figures 4 through 8, inclusive, are a sequential series of fragmentary views in vertical section taken on the line 4—4 of Figure 1 looking in the direction of the arrows, omitting certain parts of the apparatus and showing relative positions of other operative parts throughout a working cycle.

Referring to the drawings, the invention is illustrated as embodied in a container processing apparatus which is particularly adapted for charging a plurality of say four containers C with gas in a multiple stage gassing operation. The illustrated apparatus is semi-automatic in nature meaning it requires a certain degree of attention by an operator in order to process the containers, with other steps being carried out automatically out of the control of the operator. The illustrated apparatus is particularly adapted to charge with gas containers containing for example a cream product to be whipped and dispensed. Such containers are generally although not necessarily formed of metal and are fitted with a valve assembly V through which the containers can be charged with gas by means of suitable needle assemblies and through which the product in the container can be dispensed under the controlled valving action of the consumer.

The apparatus comprises, broadly, a table 10 at which the operator works, above which are disposed processing means for the containers and beneath which are mounted a power source 10a and lifting means 10b for raising and lowering a platform 11, on which the containers to be processed are disposed, in controlled stages. Such apparatus is described and illustrated in greater detail in the copending application, Serial No. 571,425, filed March 14, 1956.

A pair of tubular uprights 12 and 13, which can be fixed to the framework of the table 10, carry at their upper end processing means in the form of a gassing cross head 14 carrying a plurality of gassing needle assemblies 15–1, 15–2, 15–3 and 15–4, corresponding in number to the number of containers to be processed in any given batch. Disposed between the fixed gassing cross head 14 and the vertically movable platform 11, the latter being normally flush with the table surface 10, is a vertically movable cross head 16 carrying a plurality of needle guide and container positioning assemblies 16–1, 16–2, 16–3 and 16–4 corresponding respectively to the gassing needle assemblies.

Hinged to the front end of the vertically movable cross head 16 for swinging movement on a horizontal axis is a shield 17, and pivotally mounted to the ends of the cross head are a swinging container positioning gate and guard member 18, and a swinging ejector member 19. The positioning gate 18 swings on a horizontal axis about a pair of suitable pivot assemblies 20 and the ejector 19 about suitable pivot assemblies 21 only one of which is visible in Figures 2–8 of the drawings. The positioning gate 18 includes a front cross piece 22 carried by side arms 23 and 24, the cross piece serving the manifold functions of a handle, a guard, and a container positioning member for defining the forward position of the containers on the platform 11. The ejector 19 includes a back cross piece 25 carried at either end by L-shaped side arms 27 and normally disposed rearward of the container supporting platform 11 and beneath the pivot assemblies 21. The ejector 19 also carries counterbalance means which can take the form of forwardly extending counterweighted arms 28 and 29 which urge the ejector to the limit position shown at Figures 2–7. In this position the cross piece 25 defines the innermost position of the containers on the platform 11. Alternatively or additionally, positioning stops 11a for the bases of the containers can be provided on the platform 11 and a depending projection 16a can be carried by the underside of the cross head 16 for positioning the tops of the containers.

The positioning gate 18 carries on its arms 23 and 24 ejector latches 30, one of which is best seen in Figure 2, which can take the form of detents normally disposed behind the counterweighted arms 28 and 29 and so arranged that moving from left to right as viewed in Figures 2 and 4–8, inclusive, they pass the arms to assume the position behind the arm 29 illustrated by Figures 2, 5, 6 and 7. Forward swinging motion of the positioning gate 18, however, results in the latch 30 pulling the ejector 18 forwardly, the cross piece 25 pulling with it the batch of containers C.

The shield 17, which is normally disposed in the line of sight between the operator and the points of needle penetration, carries laterally extending ears 17a (only one of which is visible in Figures 1 and 2) at each end adapted to overhang oblique edges 24a formed on the corresponding arms 23 and 24 so that as the gate 18 is swung upwardly the shield 17 is carried with it.

The entire vertically movable cross head assembly 16 is urged downward against suitable stops on tension rods 12' and 13' by a pair of coil springs 31 and 32, respectively, surrounding the upper portions of the uprights 12 and 13. As best seen in Figure 3, the cross head 16 includes, immediately beneath the respective needle guide assemblies 16-1, 16-2, 16-3 and 16-4, a corresponding complement of container positioning guide means or centering bells, only the bell 26-4 of which is visible in the drawing at Figures 1 and 3. The centering bells include needle guide assemblies 26a described more fully in said copending application.

Disposed to one side of the positioning gate 18 (to the left as viewed in Figure 1) is a starting switch assembly 33 having an actuating tongue 34 which is normally disposed directly beneath the arm 23 (at the left of the cross head assembly as viewed in Figure 1) when the former is disposed in a vertical position as shown in Figures 2, 5, 6 and 7. The actuating tongue is connected to switch means indicated generally by the numeral 35 and so arranged that when the tongue 34 is moved to the left, the electrical contacts of the switch 35 are opened, and when moved to the right, they are closed. The tongue 34 is free to partake of limited vertical motion without operating the electrical contacts.

Operated concomitantly with the platform lift mechanism 10b beneath the table surface 10 is a cam operated switch 36, the cam 36a of which turns with the cam lifting means 10b which raises the platform 11. The switch 35 is connected in a holding circuit which by-passes the starting switch 35 once operation of the system is initiated so that a complete cycle of the apparatus obtains automatically, once initiated.

In operation, a plurality of containers are slid from the table surface 10 onto the platform 11 in their approximate positions with the positioning gate 18 raised to the position illustrated by Figure 4. The positioning gate 18 is swung downwardly with the cross piece or handle 22 pressing the containers at their lower ends against suitable positioning stops 11a on the platform 11 and at their upper ends against a depending projection on the underside of the cross head. If desired, the back cross piece 25 of the ejector can also be used to assist in the positioning of the container. Also, the side arm 23 engages the switch tongue 34 to close the starting switch 35 and the shield 17 falls into place. If, for any reason the containers become jammed in loading so that one or more do not become positioned within the working range of the centering bells, the arm 23 will not actuate the switch 33. In this fashion, damage to the gassing head is prevented.

With the starting switch closed as indicated in Figure 5, the power source 10a, which can take the form of a relay controlled electric motor, starts to turn, raising the platform 11 and, as viewed in Figure 6, closing the cam operated holding switch 36 to continue the operation. The platform 11, in the process of rising, causes the containers C to press upwardly against the centering bells 26-1 . . . 26-4, raising the vertically movable cross head 16 against the springs 31 and 32 and, continuing upwardly, causing the gassing needle assemblies 15-1 . . . 15-4 to penetrate the respective containers. In rising, the cross head carries the positioning gate 18 and its side arm 24 upwardly from the starting switch actuating tongue 34 allowing the latter to assume its normally open position as indicated diagrammatically in Figure 6. The holding switch 36, however, has in the meantime become closed so that operation continues for a full cycle until such time as the platform 11 reaches preestablished raised positions at which time predetermined gassing operations occur within the containers, all in accordance with the disclosure of said copending application. Lowering to its initial table level position, it will be observed that the side arm 24 of the positioning gate 18 presses downwardly on the switch actuating tongue 34, an action which has no influence on the operation of the electrical contacts of the switch means 35. As the platform approaches table level under the control of its control actuating mechanism, the cam 36a opens the holding switch 36 to terminate the operation of the unit. The gassing cycle then being completed, the operator seizes the handle 22 and, drawing it toward him, causes the shield 17 to raise and the ejector 18 to swing forwardly toward him through the coupling afforded by the latch 30. The cross piece 25 of the ejector forces all of the containers C onto the table 10 toward the operator after which they may be pushed aside and another batch brought into position for charging.

Because the operation of the apparatus during the actual charging cycle is out of control of the operator and because the area of actuation is shielded, there is little danger of injury to the operator. In this connection, it will be observed that the needles of the gassing needle assemblies are at all times disposed within the guides 16-1 . . . 16-4 so that the points are never in a position to puncture or injure a hand.

While the embodiment of the present invention described above constitutes a preferred form, it is to be understood that the invention can take other forms and include various modifications. Thus for example, the positioning stops 11a can be magnetized as a further aid in positioning the containers. Also, the relatively movable gassing head and support platform can be arranged so that the gassing head moves to the containers rather than the containers moving to the gassing head, as shown. Or both can be made movable. The invention should not, therefore, be regarded as limited except as defined by the following claims.

We claim:

1. Processing apparatus comprising a work surface for units to be processed, a processing space on the surface for at least one unit, a guard member movable between a first position shielding the processing space and a second position affording access thereto, an ejection member proximate to the processing space and movable between first and second positions, the first affording location of a work unit in the processing space and the motion between the first and second positions forcing the unit from the space, and separable unidirectional coupling means joining the guard and ejection members for concomitant motion from their respective first and second positions including a detent latch on the guard member and a complementary shoulder on the ejection member.

2. Processing apparatus comprising a work surface for units to be processed, a processing space on the surface for at least one unit, a guard member comprising a front cross piece and a pair of supporting arms joined thereto at opposite ends movable between a first position shielding the processing space and a second position affording access thereto, an ejection member proximate to the processing space and movable between first and second positions comprising a back cross piece and a pair of supporting arms joined thereto at opposite ends, the first position affording location of a work unit in the processing space and the motion between the first and second positions forcing the unit from the space, and separable unidirectional coupling means joining the guard and ejection members for concomitant motion from their respective first and second positions, said coupling means being disposed between corresponding supporting arms.

3. Processing apparatus comprising a work surface for units to be processed, a processing space on the surface for at least one unit, processing means adjacent the processing space, a guard member movable between a first position shielding the processing space and a second position affording access thereto, means to establish relative movement between the processing means and the units on the processing space to bring the two into operative engagement behind said guard member, an ejection member proximate to the processing space and movable between first and second positions, the first affording location of a work unit in the processing space and the motion between the first and second positions forcing the unit from the space, separable unidirectional coupling means joining the guard and ejection members for concomitant motion from their respective first and second positions, motive means to actuate the apparatus, starting switch means for the motive means adjacent the processing space and the guard member, and switch actuating means movable with the guard member to actuate the starting switch.

4. Processing apparatus as set forth in claim 3, said switch actuating means including a finger movable in vertical and horizontal directions and operable to actuate the switch means upon only one of said directions of motions, said guard member in moving to its first position being adapted to move the finger in said one direction, said switch actuating means of the guard member being disengaged from the finger upon relative movement between the units and the processing means, second switch means responsive to relative movement between the units and the processing means to energize the motive means after the guard member is disengaged from the finger.

References Cited in the file of this patent

UNITED STATES PATENTS

| | | |
|---|---|---|
| 1,133,929 | Carper | Mar. 30, 1915 |
| 2,309,246 | Henry | Jan. 26, 1943 |